May 7, 1935. W. P. NIUKKANEN ET AL 2,000,247
COMBINATION DRAFTING TABLE AND INSTRUMENTS THEREFOR
Filed Feb. 19, 1934
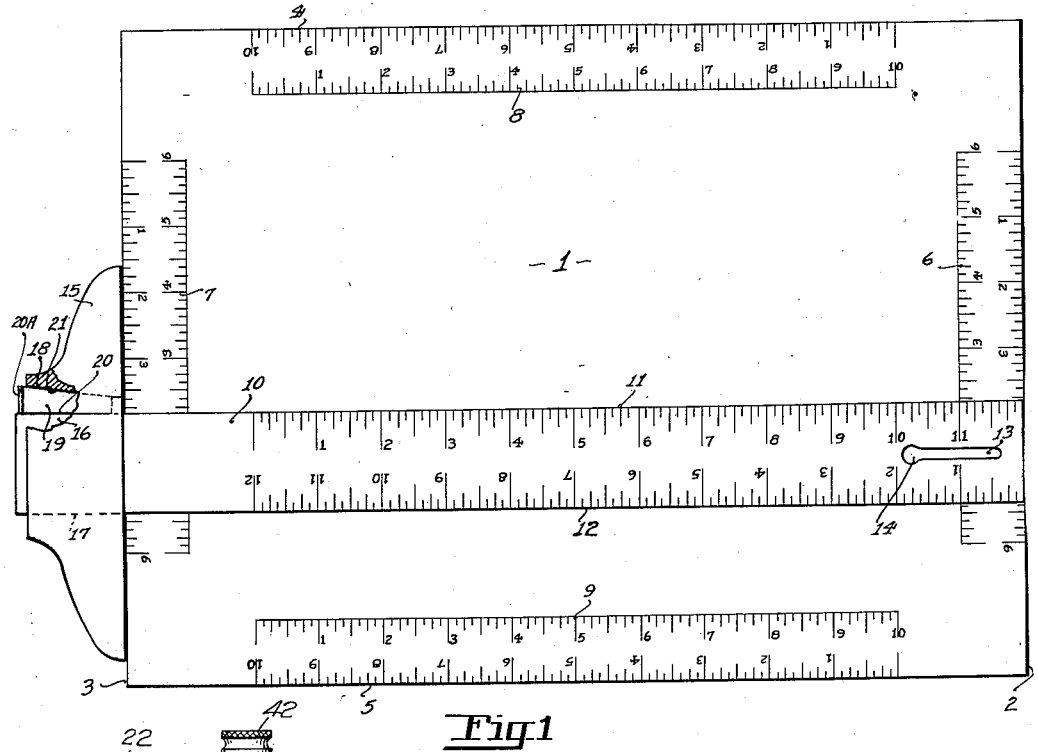
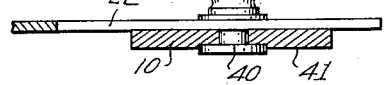
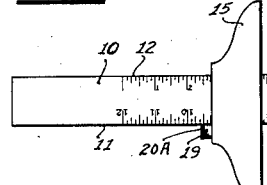
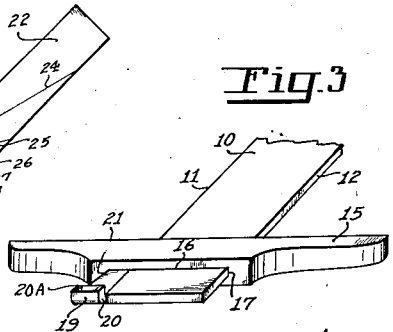
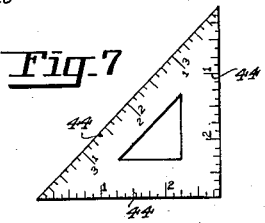
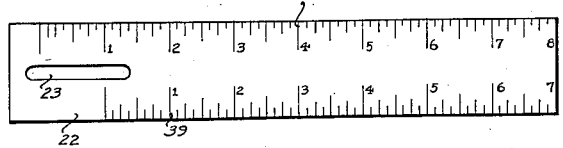
INVENTORS
WILLIAM P. NIUKKANEN
BY SIMO MIKKONEN
Samuel S. Jacobson
ATTORNEY Patented May 7, 1935

2,000,247

UNITED STATES PATENT OFFICE 2,000,247

COMBINATION DRAFTING TABLE AND INSTRUMENTS THEREFOR

William P. Niukkanen and Simo Mikkonen, Portland, Oreg.

Application February 19, 1934, Serial No. 711,878

3 Claims. (Cl. 33—75)

Our invention relates generally to drafting tables and lining and measuring instruments to be used in conjunction therewith, and the invention relates particularly to a drafting table or board and lining and measuring instruments to be used with said table or board that will eliminate the present necessity for using rulers, protractors, triangles and other measuring members.

It has heretofore been the customary practice to use standard-type T-squares, triangles, protractors, rulers and other measuring instruments with a drafting table or board provided with a smooth surface and accurate edges. While such practice produces satisfactory results, still it is our purpose to improve, by the elimination of most of the aforementioned instruments, the conditions under which drafting work may be performed so that the same will not only materially assist the draftsman in overcoming physical fatigue but also will speed up the work.

The particular and primary object of our invention is to provide, in combination with a standard-type of drafting table or board, lining and measuring instruments that may be fixedly secured to or removably attached to the table or board and a uniquely constructed T-square, which is adjustable and to which may be attached a protracting member.

An important object of our invention is to provide a graduated T-square, whose straight edge is adjustable relative to the head of the T-square and which has an adjustable protractor member secured thereto in such manner as to act as an extension of the straight edge or which may be used for striking off angles.

Another object of our invention is to provide means for measuring or striking off any number of spaced, parallel lines or angles of different degrees without requiring other measuring or dividing instruments or triangles or protractors.

A further object of the invention is to provide a drafting table or board upon which work can be performed from any of its edges with equal facility.

A further object of our invention is to provide a simple, practical, inexpensive and efficient drafting table or board and simple, practical, inexpensive and efficient instruments which can be effectively used in conjunction with said table or board.

Other objects and advantages and the nature and characteristic features of our present invention will become apparent from the following description which is to be considered in conjunction with the accompanying drawing forming a part hereof, in which:

Figure 1 is a plan-view of a drafting surface, having thereon linear graduations adjacent its edges and a plan-view of a T-square embodying our invention, which has linear graduations thereon of a like character.

Figure 2 is a plan-view of the T-square illustrated in Figure 1, showing a protracting member removably attached thereto and illustrating the adjustability of the straight edge of the T-square with respect to the head of the T-square.

Figure 3 is a perspective end-view of the T-square, showing only a fragmentary portion of the straight edge and illustrating the manner of locking the straight edge with respect to the head of the T-square.

Figure 4 is a plan-view of the protracting member shown in Figure 2, graphically indicating the demarcations for governing the accurate measurement of angles.

Figure 5 is a plan-view of the protracting member, shown in Figures 2 and 4, showing the linear graduations disposed on the side opposite the side shown in said figures.

Figure 6 is a sectional fragmentary side-view of the T-square, graphically illustrating the manner of locking the protracting member with respect to the straight edge of the T-square.

Figure 7 is a plan-view of a triangle, having linear graduations thereon that may be used in lieu of the protracting member in conjunction with the T-square.

Similar reference characters are employed in the following description to designate identical or corresponding parts when they appear in the several views of the drawing.

There is shown in Figure 1 a drawing-surface 1, which may be the drawing-surface of a drawing-board or of a drafting-table. For the purposes of clarity, it is assumed that reference character 1 illustrates the drawing-surface of a drawing-board, which has parallel edges 2 and 3 and parallel edges 4 and 5. Adjacent edges 2, 3, 4 and 5 and disposed upon the drawing-surface 1, are linear graduations 6, 7, 8 and 9. Linear graduations 6 and 7 are directly aligned with each other, and linear graduations 8 and 9 are directly aligned with each other. Each of these graduations consists of a double ruler, one opposite and reversed from the other in order to permit the drawing-board to be used in any position. It is well to note at this time that these linear graduations may be made integral with the drafting-surface 1, or the same may be placed on an independent surface which in turn may be secured thereto by any suitable means.

In order to permit the effective use of the board heretofore illustrated, a T-square embodying our invention should be used in conjunction therewith, and said T-square may be made of any material suitable for the purposes in mind. The T-square embodying our invention consists of a straight-edge 10, having linear graduations on both its faces adjacent to its sides 11 and 12. The straight-edge 10 has a slot 13 at one end thereof, and said slot has an enlarged circular portion at one end thereof as shown at 14, for a purpose hereinafter to be described. Head 15 of the T-square has a slot 16 disposed therethrough. This slot has straight-side-wall 17 and inclined side-wall 18. Straight-edge 10 is slidably disposed within the slot 16 of the head 15, and, in order to fixedly secure the straight-edge 10 within the slot so that it is in proper angular alignment with the head 15, there is provided a wedge-member 19. Wedge-member 19 has a straight side 20 that contacts the side 11 of the straight-edge 10 and an inclined side 21, which contacts the inclined side-wall 18 of the head 15. By this arrangement the straight-edge 10 may be fixedly held with respect to the head 15. The wedge-member 19 has an upturned end 20 which facilitates its removal from its position within the slot 16 whenever it is desired to slide and position the straight-edge 10 with respect to the head 15.

In order to permit the use of the T-square as a means of striking off angles, there is provided a protracting member 22, graphically illustrated in Figures 4 and 5, which may be removably attached to the straight-edge 10 by means hereinafter to be more specifically described. Protracting member 22 has a slot 23 of a length equal to the length of the slot 13 and enlarged portion 14 disposed in the straight-edge 10. One side of the protracting member 22 has inscribed thereon a plurality of lines 24, 25, 26, 27, 28 and 29, marking off angles of 15, 30, 45, 60, 75 and 90 degrees respectively, emanating from a common point 30, and there are also inscribed on the same side other lines 31, 32, 33, 34, 35 and 36, marking off angles of 15, 30, 45, 60, 75 and 90 degrees respectively, emanating from a common point 37, but directed in opposite directions from the former lines. On the opposite side of protracting member 22 are linear graduations 38 and 39, which assist the user of the invention in measuring off the lengths of the angles desired. The protracting member 22 is removably and adjustably secured to the straight-edge 10 of the T-square in the manner illustrated in Figure 6, wherein there is shown a threaded screw 40, whose head is flush with the under side 41 of the straight-edge 10. This threaded screw passes through slots 13 and 23. Knurled nut 42 is threadably disposed about the screw 40 so that by tightening the nut the protracting member 22 may be held in fixed relationship to the straight-edge 10. If it is desired to re-position the protracting member with respect to the straight-edge, the nut need only be loosened, and, if it is desired to completely disengage the protracting member 22 from the straight-edge 10, it is only necessary to loosen the nut and to shift the threaded screw so that its head is in registerable alignment with the enlarged portion 14 of the slot 13 and then simply lift the protracting member out. If it is desired to attach the protracting member to the straight-edge, the reverse process is applied.

Figure 2 graphically illustrates the cooperative relationship between the head 15 and the straight-edge 10 and the protracting member 22 and the straight-edge 10, showing also the under side 41 of the straight-edge 10, and indicating the groove 43, in which the head of the screw 40 is positioned in order to make it flush with the under side 41. It will be seen from this figure that angles of varying degrees may be drawn in either direction with respect to the straight-edge 10 and that the protracting member may even be used as a continuation of the straight-edge of the T-square.

In Figure 7 is illustrated a triangle having a plurality of linear graduations 44 thereon not only on the side shown but on the opposite side not shown, which may be used in lieu of the protracting member for the purposes of drawing angles but not with equal facility.

*Modus operandi*

For purposes of illustration, it is assumed that an angle of 15 degrees is desired to be measured. In such a case, it is only necessary to align the line 24 with the side 12 of straight-edge 10. If it is desired to strike a 15 degree angle in the opposite direction, then the protracting member 22 and threaded screw 40 is moved so that a hinging action is formed at the extreme ends of the slots 13 and 23 and then line 31 is aligned with side 11 of straight-edge 10. Other angles are measured in the identical manner.

It will be seen that by the construction illustrated, it is possible to measure off parallel lines, angles and other measurements without the use of the standard ruler, protractor, triangle or other similar instruments.

This completes the detailed description of the elements applied in our invention, and, from the foregoing description, it will be seen that we have produced a drafting table and instruments to be used in conjunction therewith, which substantially fulfill the objects of the invention set forth herein.

While this specification sets forth in detail the present and preferred construction of the invention, still in practice deviations from such detail as come within the scope of the mechanic may be resorted to which do not depart from the spirit of the invention herein. It is to be understood, therefore, that we consider as our own all such modifications and adaptations as fairly fall within the scope of the invention defined in the appended claims.

Having thus described our invention, what we claim as new and useful and upon which we desire to secure Letters Patent is:

1. In combination, a drawing-surface having graduations adjacent its edges and a T-square having its head and straight-edge movable with respect to each other, a wedging member adapted to be placed within a slot formed within the head to hold the straight-edge and the head in fixed relationship to each other, said straight-edge having graduations thereon capable of cooperative use with the graduations on the drawing-surface a slot formed in the straight-edge, a protracting member removably secured to said straight-edge and angularly adjustable relative to said straight-edge, a slot formed in the protracting member, and means for securing said protracting member to said straight-edge, said means consisting of a bolt and nut combination fitting within the slots incorporated within the straight-edge and the protracting member and when tightened adapted for holding the said straight-edge and said protracting member in fixed relationship to each other.

2. A T-square to be used with a device of the class described and for the purposes illustrated, comprising a head having a slot formed therein, a straight-edge, having linear graduations on each side thereof, slidably disposed within said slot and a wedging member adapted to be forcibly inserted within the slot in the head and adjacent one side of the straight edge, said wedging member having one inclined edge adapted to lie against the inclined wall of the slot formed within the head and having one straight-edge on the opposite side thereof and a grip for manipulating the wedging member for holding said straight-edge in fixed alignment to said head.

3. In combination, a T-square of the class described to be used for the purposes herein disclosed, comprising a head having a slot formed therein, a straight-edge, having linear graduations on each side thereof, slidably disposed within said slot, said straight-edge having a slot therein, a wedge member for retaining said straight-edge in fixed relationship to said head, a protracting member, having a slot therein, adapted for disengageable engagement with the straight-edge, said protracting member having linear graduations on one side and angular measurements on the other side thereof which are adapted for use with the straight-edge for striking off angles and means for effecting the connection between the straight-edge and the protracting member.

WILLIAM P. NIUKKANEN.
SIMO MIKKONEN.